United States Patent [19]

Flax

[11] Patent Number: 4,621,645
[45] Date of Patent: Nov. 11, 1986

[54] METHOD OF ESTIMATING TISSUE ATTENUATION USING WIDEBAND ULTRASONIC PULSE AND APPARATUS FOR USE THEREIN

[75] Inventor: Stephen W. Flax, Waukesha, Wis.
[73] Assignee: General Electric Company, Milwaukee, Wis.
[21] Appl. No.: 650,929
[22] Filed: Sep. 14, 1984
[51] Int. Cl.⁴ ............................................. A61B 10/00
[52] U.S. Cl. ...................................... 128/660; 73/599
[58] Field of Search .................... 128/660; 73/599, 602

[56] References Cited

U.S. PATENT DOCUMENTS

| | | | |
|---|---|---|---|
| 4,389,893 | 6/1983 | Ophir et al. | 128/660 X |
| 4,414,850 | 11/1983 | Miwa et al. | 128/660 X |
| 4,441,368 | 4/1984 | Flax | 73/599 |
| 4,452,082 | 6/1984 | Miwa | 73/599 |
| 4,452,085 | 6/1984 | Pelc et al. | 128/660 X |

FOREIGN PATENT DOCUMENTS 406531  11/1973  U.S.S.R. ............................. 128/660

OTHER PUBLICATIONS

Dines, K. A. et al, "Ultrasonic Attenuation Tomography of Soft Tissues", Ultrasonic Imaging, vol. 1, No. 1, 1979, pp. 16–33.
Kuc, R. et al, "Estimating the Acoustic Attenuation Coefficient Slope for Liver from Reflected Ultrasound Signals", IEEE Transactions on Sonics and Ultrasonics, vol. SU-26, No. 5, Sep. 1979.

Primary Examiner—Henry J. Recla
Assistant Examiner—Francis J. Jaworski
Attorney, Agent, or Firm—Flehr, Hohbach, Test, Albritton & Herbert

[57] ABSTRACT

Tissue attenuation of ultrasound energy is determined by transmitting a wide band ultrasonic pulse into tissue and obtaining a measure of the average center frequency of the reflected pulse between two levels in the tissue. The log amplitude decay is estimated from a reflected pulse, and the attenuation coefficient is then obtained from the ratio of log amplitude decay to average center frequency between the two levels.

11 Claims, 2 Drawing Figures

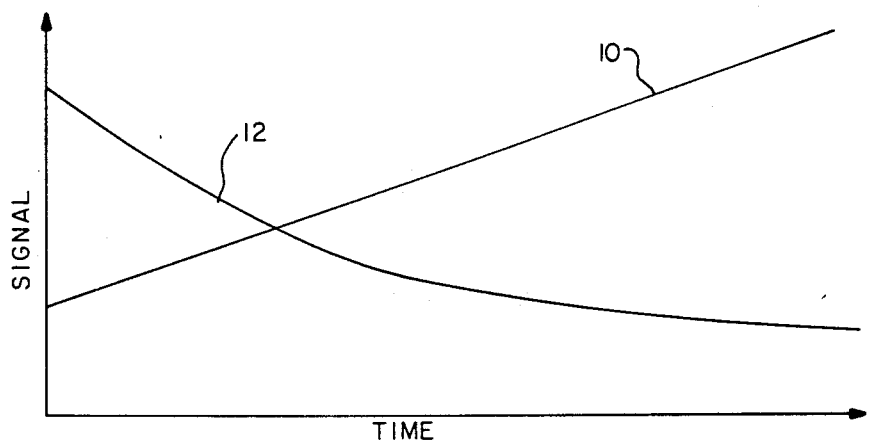
FIG. —1
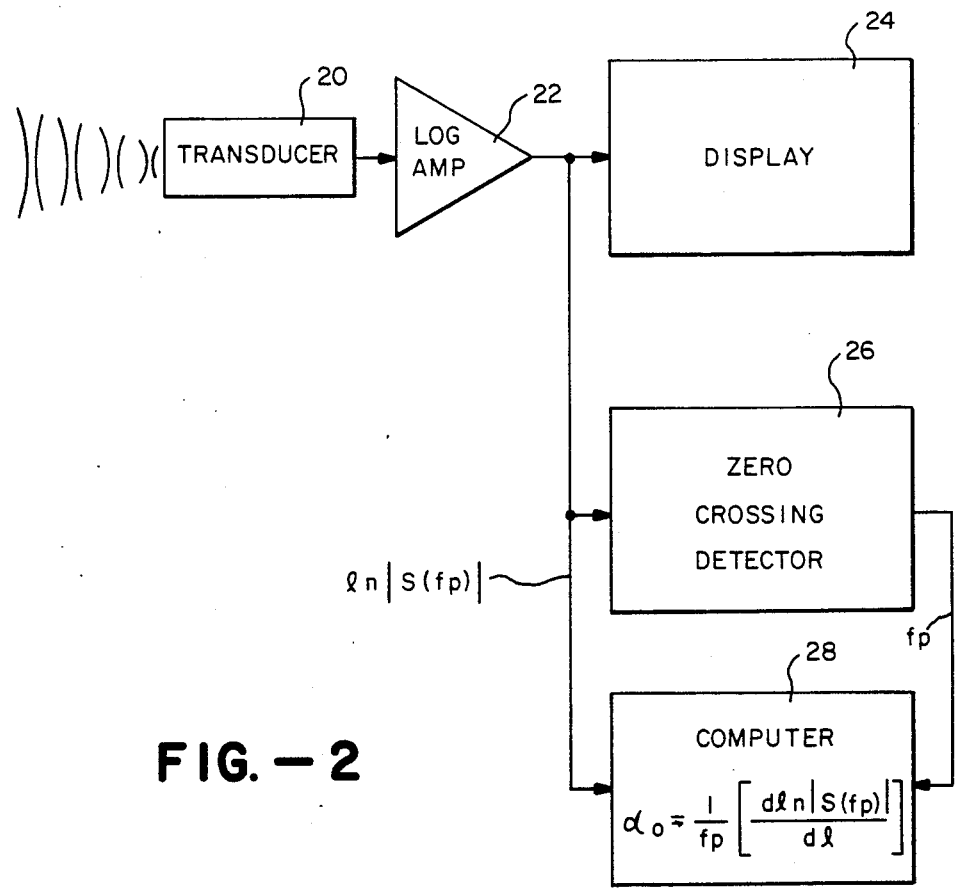
FIG. —2

METHOD OF ESTIMATING TISSUE ATTENUATION USING WIDEBAND ULTRASONIC PULSE AND APPARATUS FOR USE THEREIN

This invention relates generally to ultrasound diagnostic systems, and more particularly the invention relates to a method and means for determining tissue attenuation of ultrasonic energy.

Tissue attenuation of a reflected ultrasonic wave is a function of path length through the tissue and of frequency of the wave. Since the frequency of the ultrasonic wave decreases in passing through the tissue, attenuation is a non-linear function of propagation for a wideband pulse.

To facilitate analysis of a reflected ultrasound wave, automatic time gain control (TGC) circuitry is employed to compensate for tissue attenuation. The TGC signal is often estimated as a linear curve when in fact the curve is non-linear due to the frequency variable attenuation.

Disclosed in U.S. Pat. No. 4,441,368 for "Method and Means for Determining Ultrasonic Wave Attenuation in Tissue" is a method of determining tissue attenuation by detecting frequency shift through the tissue using a zero crossing detector. This technique is employed in U.S. Pat. No. 4,452,085 for "Method and Means for Generating Time Gain Compensation Control Signal for Use in Ultrasonic Scanner and the Like".

U.S. Pat. No. 4,389,893 for "Precision Ultrasound Attenuation Measurement" proposes a method of determining tissue attenuation by characterizing attenuation in a narrow frequency band. To achieve the narrow frequency band, either a narrow band pulse is employed or narrow band filters are used in detecting reflections of a wideband pulse to thereby estimate amplitude attenuation at one frequency.

The present invention is directed to obtaining a measure of amplitude attenuation by tissue using a wideband ultrasonic wave without the need for narrow bandpass filters. More particularly, attenuation in a region is obtained by measuring the signal amplitude variation in passing through the tissue to provide a measure of amplitude curve slope and obtaining a measure of the center frequency, such as the mean or average frequency, of the wideband signal when passing through the tissue. The mean or average frequency can be obtained, for example, by using a zero crossing detector as in U.S. Pat. No. 4,441,368, supra. Since ultrasonic transducers as used with medical diagnostic equipment are typically wideband, there is no need for using special transducers when characterizing the attenuation or for the use of bandpass filters as proposed in U.S. Pat. No. 4,389,893, supra.

The invention and objects and features thereof will be more readily apparent from the following detailed description and appended claims when taken with the drawing in which:

FIG. 1 is a plot of a TGC signal and a plot of actual attenuation.

FIG. 2 is a functional block diagram illustrating apparatus for determining attenuation in accordance with the invention.

Referring to FIG. 1 of the drawing, it will be noted that the typical TGC signal 10 as used in ultrasonic diagnostic systems to compensate for tissue attenuation in a linear curve. However, since frequency decreases with time, the frequency dependent attenuation also decreases with time. Accordingly, the actual ultrasound attenuation, as shown at 12 is non-linear due to the decrease in frequency of the reflected ultrasonic wave as a function of time and thus the decrease in attenuation.

In accordance with the present invention a method is provided for estimating tissue attenuation based upon the amplitude decay of wideband signals propagating through tissue. In U.S. Pat. No. 4,441,468 it is shown that for a Gaussian shaped spectral pulse traveling in a tissue with an attenuation that is linearly related to frequency, the frequency shift with depth (as estimated by counting zero crossings) is proportional to the attenuation coefficient of tissue. The equation describing this center frequency shift $f_{peak}$, as a function if depth is given as:

$$f_{peak} = f_o - \alpha_o l \sigma^2 \tag{1}$$

where
$f_o$ = starting pulse center frequency
$\alpha_o$ = attenuation coefficient
$l$ = depth into the tissue
$\sigma$ = pulse bandwidth This relationship had been derived from the basic equation describing the propagation of a Gaussian pulse through the tissue as $$s(f) = a_o(e^{-\alpha_o f l})(e^{-(f-f_o)^2/2\sigma^2}) \tag{2}$$

$a_o$ = peak spectral power density coefficient
$s(f)$ = power spectrum

Since the basic shape of the Gaussian power spectral pulse remain constant and only shifts in frequency, the center frequency power density is proportional to the average power of the spectrum. Thus, substituting the expression for the shifted center frequency from equation (1) into equation (2), we obtain an expression for how the center power spectral density changes with depth. This is given in equation (3) as:

$$S(f_p) = a_o e^{-[\alpha_o l f_o - \alpha_o^2 l^2 \sigma^2/2]} \tag{3}$$

Since ultrasound signals are usually both displayed and expressed as logarithms, taking the natural log of equation (3) we obtain:

$$\ln|S(f_p)| = \ln a_o - [\alpha_o l f_o - \alpha_o^2 l^2 \sigma^2/2] \tag{4}$$

Since we are interested in obtaining the relationship between how the log of the power spectrum changes as a function of depth, we can differentiate equation (4) to obtain $$d[\ln|S(f_p)|]/dl = -\alpha_o f_o + \alpha_o^2 l \sigma^2 \tag{5}$$

Unfortunately, from equation (5), we see that the change in the log power spectrum is non-linearly related to $\alpha_o$ because of the $(-\alpha_o^2 l \sigma^2)$ term. Hence, as is generally accepted, if a narrow band signal is assumed then $\sigma^2$ may be neglected, and $$d[\ln|s(f_p)|]/dl = -\alpha_o f_o,$$

a very desirable result.

It is generally believed that without this narrow band condition, the non-linearity imposed by the $(-\alpha_o^2 l \sigma^2)$ term makes the measurement unsuitable for practical amplitude attenuation estimations. However, a very interesting result can be observed if $f_o$ is factored out of equation (5). That is, $$d[\ln|S(f_p)|]/dl = \alpha_o[f_o - \alpha_o l \sigma^2] \quad (6)$$

where the term in brackets is readily observed to simply be the center frequency, $f_p$, as provided in equation (1).

Thus, it is shown that the rate of change of amplitude of a reflected ultrasonic wave is a direct function of the attenuation coefficient, $\alpha_o$, and the center of frequency, $f_p$, of the wave frequency spectrum passing through the tissue. Accordingly, the attenuation coefficient for the tissue region is readily obtained from the slope of the log amplitude decay and the measured mean frequency or center frequency, $f_p$, of the spectrum.

Figure two is a functional block diagram of apparatus for use in determining tissue attenuation in accordance with one embodiment of the invention. A wideband transducer 20 alternately transmits ultrasonic pulses into tissue and receives reflected signals which are attenuated by the tissue. The reflected signals are converted to electrical signals and amplified by log amplifier 22. The amplified signal is displayed at 24 with the pixel intensities being a function of acoustic energy at different levels in the tissue. Thus, the change in amplitude of the reflected ultrasonic wave between two levels in the tissue can be determined from the pixel intensity values on the display at points corresponding to the two levels, thereby approximating the slope of the amplitude curve.

The amplified signal is applied to a zero crossing detector 26 which counts the number of zero crossings between the two levels. From this count the mean center frequency, $f_p$, can be estimated. The tissue attenuation coefficient, $\alpha_o$, is then obtained by computer 28 from the ratio of change in display intensity to mean center frequency of the ultrasonic wave between the two tissue depths.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A method of estimating tissue attenuation of ultrasound energy comprising the steps of:
   transmitting a wide band ultrasonic pulse into said tissue, said pulse having a frequency spectrum with a center frequency,
   detecting said pulse as reflected by said tissue,
   estimating decay of a measure of amplitude of said reflected pulse between two levels in said tissue to approximate the slope of the decay,
   estimating center frequency of said reflected pulse between said two levels, and
   obtaining tissue attenuation from the approximated slope of a measure of amplitude and said center frequency.

2. The method as defined by claim 1 wherein said measure of amplitude is the natural logarithm of amplitude of said reflected wave.

3. The method as defined by claim 2 wherein said step of estimating center frequency estimates mean frequency.

4. The method as defined by claim 3 wherein said step of obtaining tissue attenuation is based on the relationship $$d[\ln|S(f_p)|]/dl = \alpha_o f_p$$

where
   $S(f_p)$ = power spectrum
   $l$ = depth in the tissue
   $\alpha_o$ = tissue attenuation coefficient
   $f_p$ = mean center frequency of the spectrum in the tissue between two levels.

5. The method as defined by claim 3 wherein the step of estimating average frequency includes counting zero crossings of the spectrum between the two levels.

6. Apparatus for use in estimating tissue attenuation of ultrasound energy comprising:
   means for transmitting a wideband ultrasonic pulse into said tissue,
   means for receiving said pulse as reflected by said tissue and generating an electrical signal in response thereto,
   an amplifier interconnected to receive and amplify said electrical signal,
   means interconnected to receive said amplified electrical signal and provide a measure of amplitude of said amplified electrical signal for two different levels in said tissue and for producing a first signal indicative of variation between said signals,
   means for determining the center frequency of said electrical signal corresponding to said reflected pulse between said two different levels and providing a second signal indicative thereof, and means responsive to said first and second signals for estimating the said tissue attenuation of ultrasound energy.

7. Apparatus as defined by claim 6 wherein said means for transmitting and said means for receiving comprise a wide band ultrasonic transducer.

8. Apparatus as defined by claim 6 wherein said means for determining center frequency comprises a zero crossing detector.

9. Apparatus as defined by claim 6 wherein said center frequency is a mean center frequency.

10. Apparatus as defined by claim 6 wherein said center frequency is an average center frequency.

11. Apparatus as defined by claim 6 wherein said amplifier is logarithmic.

* * * * *